United States Patent
Hawryluk et al.

(10) Patent No.: US 6,347,176 B1
(45) Date of Patent: Feb. 12, 2002

(54) ACOUSTO-OPTICAL LIGHT TUNNEL APPARATUS AND METHOD

(75) Inventors: Andrew M. Hawryluk, Los Altos Hills; David G. Stites, Los Altos; Boris Grek, Santa Clara, all of CA (US)

(73) Assignee: Ultratech Stepper, Inc., San Jose, CA (US)

( * ) Notice: Subject to any disclaimer, the term of this patent is extended or adjusted under 35 U.S.C. 154(b) by 50 days.

(21) Appl. No.: 09/595,169

(22) Filed: Jun. 15, 2000

(51) Int. Cl.[7] .................................................. G02B 6/00
(52) U.S. Cl. .............................. 385/133; 385/5; 385/7; 385/146
(58) Field of Search ................................ 385/1–3, 5, 7, 385/10, 131–133, 146

(56) References Cited

U.S. PATENT DOCUMENTS

| | | |
|---|---|---|
| 4,511,220 A | 4/1985 | Scully .......................... 350/403 |
| 4,521,075 A | 6/1985 | Obenschain et al. ... 350/162.11 |
| 4,744,615 A * | 5/1988 | Fan et al. .................... 385/146 |
| 5,224,200 A | 6/1993 | Rasmussen et al. ........ 385/146 |
| 5,852,693 A | 12/1998 | Jeong .......................... 385/47 |

OTHER PUBLICATIONS

I.C. Chang, Handbook of Optics, 1995, Chapter 12 pp 12.1–12.54.

* cited by examiner

Primary Examiner—Brian Healy
Assistant Examiner—Kevin S Wood
(74) Attorney, Agent, or Firm—Allston L. Jones

(57) ABSTRACT

A light tunnel apparatus (200 or 300) having an output end (56 or 98), for uniformizing light (L) that travels through a light tunnel (30 or 80). The apparatus comprises a light tunnel having first and second sides (36, 40 or 86, 90), and one or more AO modulators (210 or 310) respectively arranged on at least one of the first and second sides. The AO modulators are arranged such that activating the one or more of them causes at least one of the first and second sides to be displaced. This displacement changes the path of light traveling through the light tunnel by an amount sufficient to reduce illumination non-uniformities at the output end. The light tunnel may be a hollow light tunnel (30) with reflective inner surfaces, or a solid light tunnel (80) with a refractive index. A method of uniformizing illumination using a light tunnel is also disclosed.

25 Claims, 3 Drawing Sheets

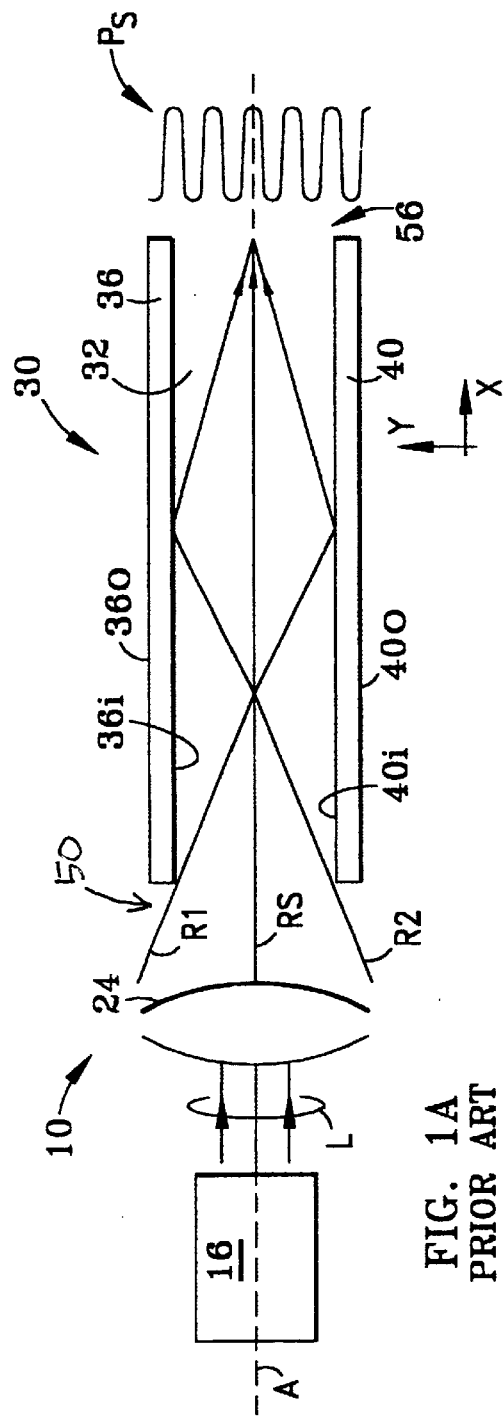
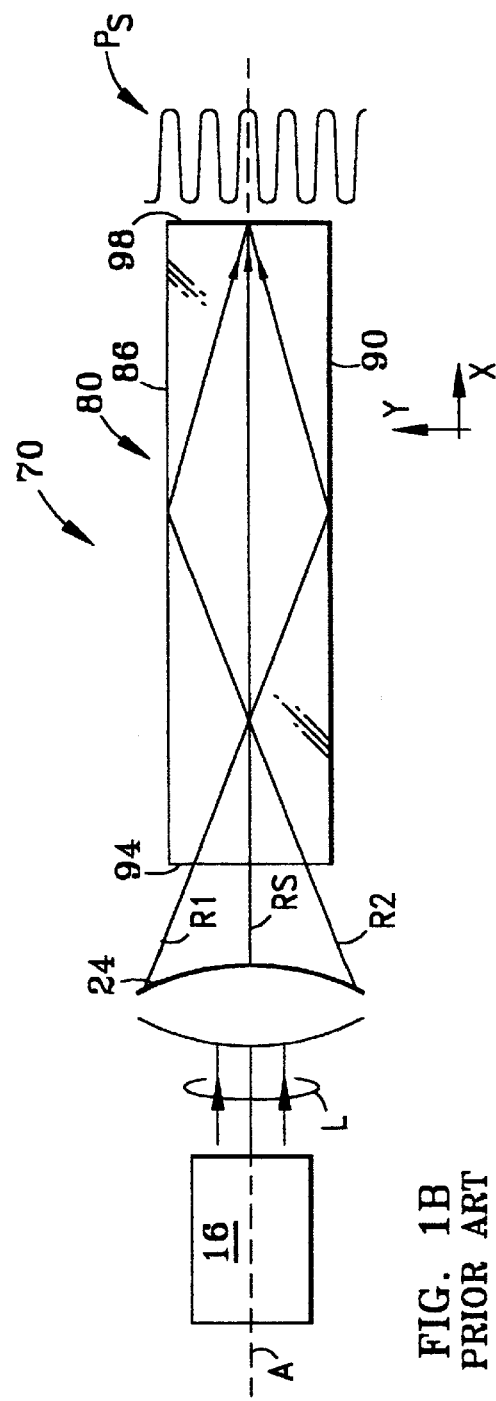
FIG. 1A
PRIOR ART
FIG. 1B
PRIOR ART

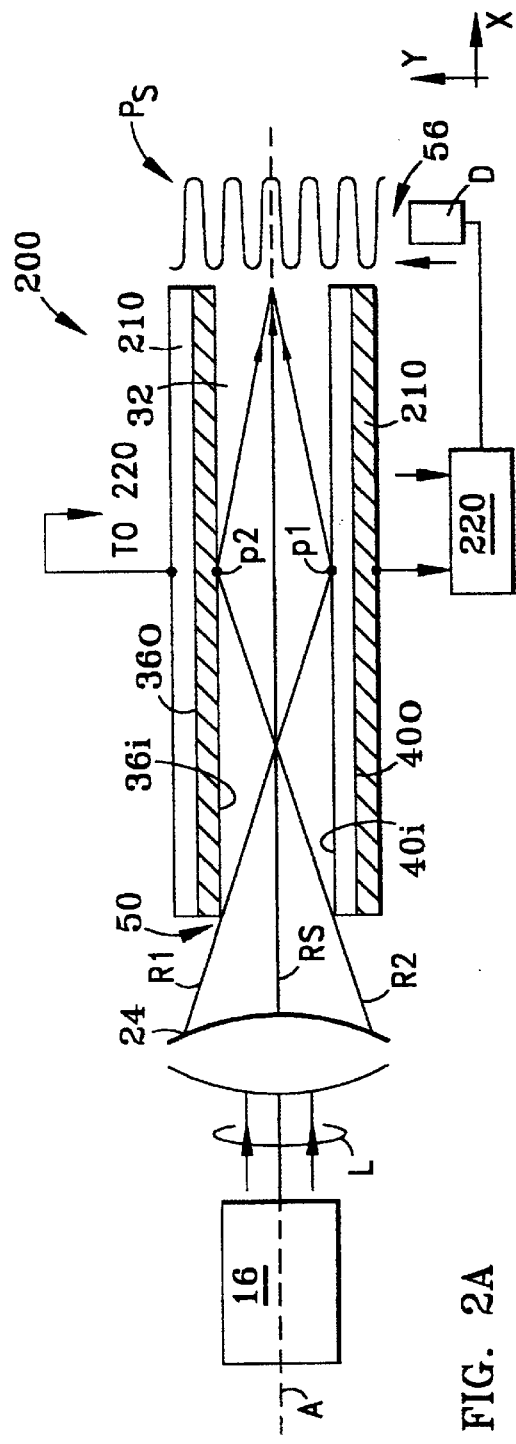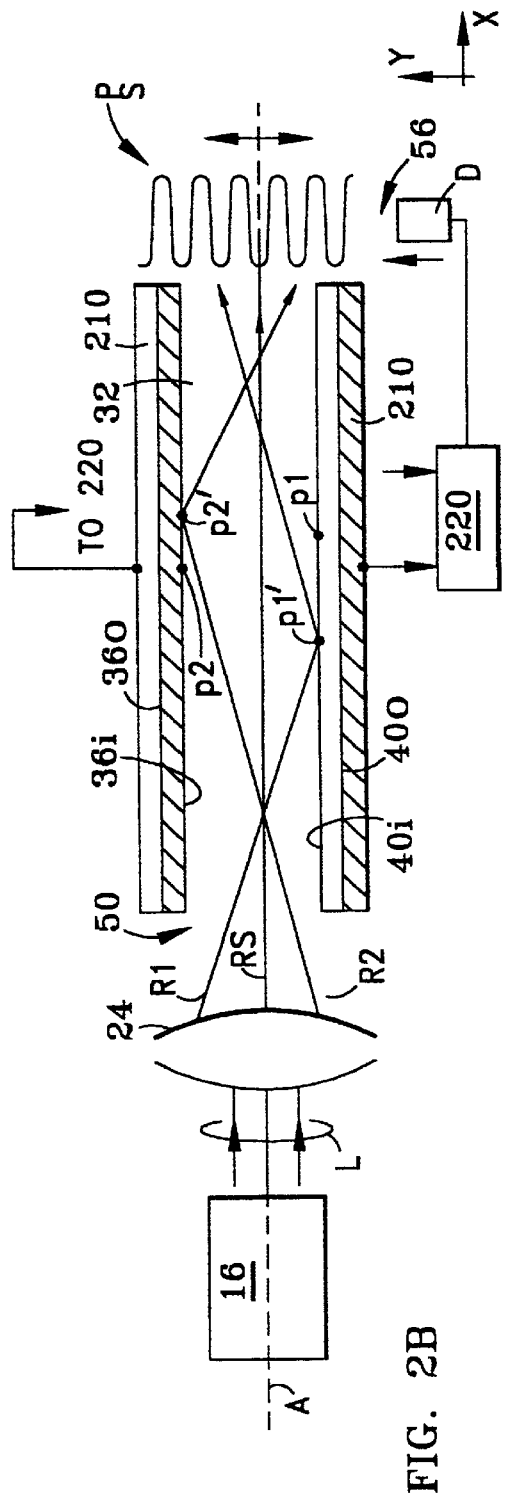

ACOUSTO-OPTICAL LIGHT TUNNEL APPARATUS AND METHOD

FIELD OF THE INVENTION

The present invention relates to the field of illumination, and in particular to light tunnels used in optical systems such as illuminators to achieve uniform illumination.

BACKGROUND OF THE INVENTION

Achieving uniform illumination is necessary in numerous optical applications, and is particularly important in the fields of microscopy, and the relatively new field of photolithography. Many illumination uniformization techniques have evolved over the years to meet the increasing demands on illumination uniformity. With the advent of the laser in the 1960's, new techniques have been developed to deal with illumination non-uniformities arising from interference effects due to the coherent nature of laser light.

In certain applications, such as photolithography, materials processing and the like, it is desirable to illuminate an object with light having an intensity distribution that is both macroscopically and microscopically uniform. Here, macroscopic means dimensions comparable to the size of the object being illuminated and microscopic means dimensions comparable to the size of the wavelength of the illumination. In many of these applications, it is further desirable to use a pulsed laser source and to have a spatially uniform intensity distribution. However, the light output of a pulsed laser source is spatially non-uniform. Macroscopically, the light beam often has a gaussian-like cross-section ("profile"). A great deal of effort has gone into fabricating lasers that emit a beam having a more uniform profile, but even these are only uniform to +/−10% over limited areas. As a result, it is often necessary to use auxiliary optics with a pulsed laser light source to make the illumination more uniform.

The challenge in producing a spatially uniform intensity distribution from a laser source arises from its inherent temporal and spatial coherence. When two incoherent light beams overlap, the intensities of the two beams add. However, when two coherent beams overlap, the electric fields of the two beams add, which can produce an intensity having an interference pattern comprising fringes not present in an incoherent illumination system. As a result, the traditional methods of producing uniform illumination with incoherent sources are typically unsuitable for coherent sources like lasers.

With reference to FIGS. 1A and 1B, there are shown schematic cross-sectional diagrams of conventional illumination uniformizer apparatus 10 and 70 for achieving uniform macroscopic illumination. The conventional uniformizer apparatus works well for incoherent (i.e., "non-laser") sources, but is inadequate for coherent (i.e., "laser") sources. For many applications, apparatus 10 of FIG. 1A comprises, along an optical axis A, a laser light source 16 emitting short pulses of coherent light L (e.g., 10 ns/pulse) comprising light rays R1 and R2, a condenser optical system 24, and a hollow light tunnel 30 with an interior region 32, upper and lower walls 36 and 40, respectively, and corresponding highly reflective inner surfaces 36i and 40i and outer surfaces 36o and 40o respectively. Light tunnel 30 further includes an input end 50 adjacent optical system 24, and an output end 56 at the distal end of tunnel 30 from optical system 24. A material often used for walls 36 and 40 of hollow light tunnel 30 is quartz, which is often coated with a high-reflectivity material such as a metal or a dielectric.

With reference to FIG. 1B, apparatus 70 includes the same elements, except that instead of hollow light tunnel 30, apparatus 70 includes a solid light tunnel 80 having an index of refraction $n_1$, upper and lower surfaces 86 and 90, an input end 94 and an output end 98. A material often used for solid light tunnel 70 is fused quartz, which has a refractive index of about 1.5 in the visible wavelengths. Apparatus 10 and 70 are commonly used with incoherent sources to achieve better than +/−1% uniformity at their respective output ends 56 and 98.

Because of the coherent nature of light source 16, intersecting light rays R1 and R2 passing through the light tunnel produce a light intensity distribution in the form of a standing sinusoidal wave pattern $P_s$ at the output ends 56 and 98 of light tunnels 30 and 80, respectively. Here, two rays R1 and R2 and a central ray RS are shown for the sake of illustration. The period of standing wave pattern $P_s$ is determined by the wavelength of the laser light and the angle between intersecting light rays R1 and R2, between rays R1 and RS, and between rays R2 and RS. In practice, there are many pairs of intersecting light rays (depending on the number of reflections), with each pair producing a standing wave pattern. The length and width of light tunnels 30 and 80 define the angle between intersecting rays R1, R2, and RS and the path length difference (i.e., the phase) between the intersecting rays determines the relative position of the irradiance maxima in standing wave pattern $P_s$.

A prior art technique for eliminating interference effects (e.g., standing wave pattern $P_s$) to achieve uniform illumination using a light tunnel is the breaking of the coherent light into packets and adding the packets incoherently, or by rotating a random diffuser between the light source and the light pipe entrance.

There are several U.S. patents directed to such techniques for eliminating interference effects that are relevant to light tunnel illumination systems. For example, U.S. Pat. No. 4,744,615, entitled "LASER RAY HOMOGENIZER," describes a coherent laser ray having a possibly non-uniform spatial intensity distribution that is transformed into an incoherent light ray having a substantially uniform spatial intensity distribution by homogenizing the laser ray with a light tunnel. When the cross-section of the light tunnel is a polygon (as preferred) and the sides of the tunnel are all parallel to the axis of the tunnel (as preferred), the laser light at the exit of the light tunnel (or alternatively at any image plane with respect thereto) has a substantially uniform intensity distribution and is incoherent only when the aspect ratio of the tunnel (length divided by width) equals or exceeds the co-tangent of the input ray divergence angle theta and when $W_{min} => 2RL_{coh}$, where $W_{min}$ is the minimum required width for the light tunnel, $L_{coh}$ is the effective coherence length of the laser light being homogenized and R is the chosen aspect ratio for the light tunnel. This approach restricts the ratio of the tunnel's length to width and consequently, the number of bounces for the light rays. However, the number of bounces affects the "macro-uniformity" of the output of the tunnel. As a result, this approach can impact the macro-uniformity at the output of the homogenizer tunnel.

U.S. Pat. No. 5,224,200, entitled "COHERENCE DELAY AUGMENTED LASER RAY HOMOGENIZER," describes a system in which the geometrical restrictions on a laser ray homogenizer are relaxed by using a coherence delay line to separate a coherent input ray into several components each having a path length difference equal to a multiple of the coherence length with respect to the other components. The components recombine incoherently at the output of the homogenizer, and the resultant ray has a more uniform spatial intensity suitable for microlithography and laser pantogography.

U.S. Pat. No. 4,511,220, entitled "LASER TARGET SPECKLE ELIMINATOR," describes an apparatus for eliminating the phenomenon of speckle with regard to laser light reflected from a distant target whose roughness exceeds the wavelength of the laser light. The apparatus includes a half plate wave member, a first polarizing ray splitter member, a totally reflecting right angle prism, and a second polarizing ray splitter member, all of which are in serial optical alignment, that are used in combination to convert a linearly (i.e., vertically) polarized light ray, which is emitted by a laser having a known coherence length, into two coincident, orthogonally polarized, rays that are not coherent with each other, and that have an optical path difference which exceeds the known coherence length of the emitting laser, to eliminate the speckle.

U.S. Pat. No. 4,521,075, entitled "CONTROLLABLE SPATIAL INCOHERENCE ECHELON FOR LASER", describes a system for achieving very uniform illumination of a target. A ray of broadband spatially-coherent light is converted to light with a controlled spatial incoherence and focused on the target. An echelon-like grating breaks the ray up into a large number of differently delayed raylets with delay increments larger than the coherence time of the ray, and a focusing lens overlaps the raylets to produce at the target a complicated interference pattern modulated by a smooth envelope that characterizes the diffraction of an individual raylet. On long time scales, compared to the coherence time, the interference pattern averages out, leaving only the smooth diffraction envelope. This approach only works for a sufficiently long time duration and therefore limits the laser pulse length. This may not be an acceptable solution for some applications.

In sum, the above described prior art techniques are either too complex to apply to light tunnel systems, or are unduly restrictive in their application.

SUMMARY OF THE INVENTION

The present invention relates to the field of illumination, and in particular to light tunnels used in optical systems such as illuminators used to achieve uniform illumination. The present invention solves the above-described uniformity problems by reducing or removing the effects of standing wave patterns by laterally shifting the standing wave pattern at the output end of the light tunnel at high speed by actively shifting the boundaries of the light tunnel using an acousto-optic (AO) modulator.

Accordingly, a first aspect of the present invention is a light tunnel apparatus having an output end for uniformizing light traveling through the light tunnel. The apparatus comprises a light tunnel having first and second sides, and one or more AO modulators respectively arranged on at least one of the first and second sides. The AO modulators are arranged such that their activation causes at least one of the first and second sides to be displaced. This displacement changes the path of light traveling through the light tunnel by an amount sufficient to reduce illumination non-uniformities at the output end. The light tunnel may be hollow with reflective inner surfaces, or a solid light tunnel made from transparent material with a refractive index greater than 1.

A second aspect of the invention is an illumination uniformizer apparatus comprising, in order along an optical axis, a light source (e.g., a laser), a condenser optical system, and the light tunnel apparatus of the present invention as described above.

A third aspect of the present invention is a method of uniformizing light traveling through a light tunnel having first and second sides and an output end. The method comprises the steps of first, injecting light into the light tunnel. The next step is then displacing at least one of the first and second sides by injecting acoustic energy into the light tunnel through at least one of the first and second sides. This second step may involve driving an AO modulator at a frequency of 100 MHz or greater. The light traveling through the tunnel comprises light rays having a path length which, depending on the exact nature of the path, can vary by a half wavelength or more due to the modulator. Preferably, the displacement of the one or more sides is such that interfering light rays are imparted with a path length difference greater than half the wavelength of the light rays.

BRIEF DESCRIPTION OF THE DRAWINGS

FIG. 1A is a cross-sectional schematic diagram of a prior art light tunnel uniformizer apparatus, wherein the light tunnel is hollow;

FIG. 1B is a cross-sectional schematic diagram of a prior art light tunnel uniformizer apparatus, wherein the light tunnel is solid;

FIG. 2A is a cross-sectional schematic diagram of the light tunnel uniformizer apparatus of the present invention with a hollow light tunnel, showing the AO modulators and the paths of light rays through the light tunnel when the AO modulator is not activated;

FIG. 2B is a cross-sectional schematic diagram of the light tunnel uniformizer apparatus of the present invention having a hollow light tunnel, showing the AO modulators and the paths of light rays through the light tunnel when the AO modulator is activated;

DETAILED DESCRIPTION OF THE INVENTION

Figure 3A:
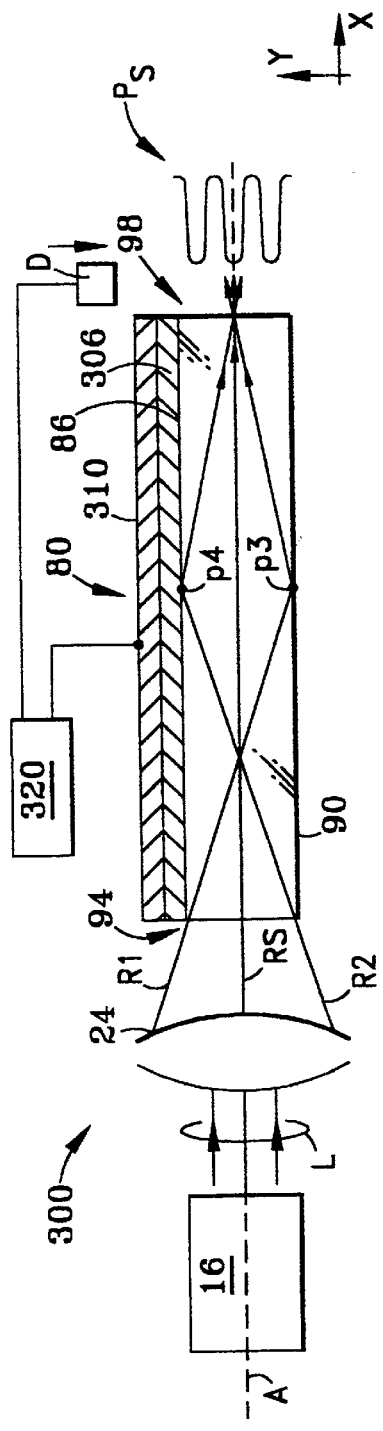
FIG. 3A is a cross-sectional schematic diagram of the light tunnel uniformizer apparatus of the present invention with a solid light tunnel, showing the AO modulators and the paths of light rays through the light tunnel when the AO modulator is not activated.

The present invention relates to the field of illumination, and in particular to light tunnels used in optical systems such as illuminators used to achieve uniform illumination.

Hollow Light Tunnel Embodiment

With reference to FIGS. 2A and 2B, there is shown light tunnel uniformizer apparatus 200 similar to prior art apparatus 10, except that light tunnel 30 includes, on upper and lower surfaces (i.e., first and second sides) 36o and 40o, an AO modulator 210. AO modulators are discussed in Chapter 12 of the book "Handbook of Optics," Volume II (Devices, Measurements and Properties), Michael Bass, Editor-in-Chief, published by McGraw-Hill, Inc., said Chapter 12 being incorporated herein by reference for its basic teachings of AO devices, and AO modulators in particular. AO modulator 210 may be purchased commercially from several suppliers, such as Isomet Corp, Springfield, Va., and NEOS Technologies, Melbourne, Fla. Further included in apparatus 200 is an AO modulator control unit 220 electrically connected to AO modulator 210 which can also be commercially purchased from Isomet Corp and NEOS Technologies.

Also included in apparatus 200 in a preferred embodiment of the present invention is a light-sensitive detector D movably arranged near light tunnel output end 56 and electrically connected to AO modulator control unit 220. Detector D is movable across output end 56 to measure the light energy (e.g., irradiance) distribution at output end 56. Detector D outputs a signal corresponding the light energy incident thereon. An exemplary detector D is a CCD array camera purchased from the COHU Corporation.

With reference to FIG. 2A, laser light is relayed from laser light source 16 and is injected into interior region 32 of light tunnel 30 over a range of angles via condenser optical system 24. Three light rays RS, R1 and R2 are shown. Light ray RS is a straight-through ray, while light rays R1 and R2 are incident reflective inner surfaces 36$i$ and 40$i$ at given angles and are reflected therefrom at points p1 and p2 toward output end 56. Typically, light tunnel surfaces 36$i$ and 40$i$ are made of a glass, such as fused silica, or a ceramic, and the inner surfaces are coated with a metal (e.g., aluminum or chromium) and/or a dielectric layer to obtain maximum reflectivity. Standing wave pattern $P_s$, as described above, is formed at output end 56 from the interference between straight through ray RS and rays R1 and R2 that undergo a single reflection. Detector D can be moved to output end 56 to measure standing wave pattern $P_s$ and the degree of illumination non-uniformity.

With reference now to FIG. 2B, AO modulator 210 is activated by an electrical signal sent from AO modulator control unit 220. The latter, for example, may drive AO modulator 210 at a frequency of about 100 MHz or so. AO modulator 210 is designed so as to set up an acoustic wave pattern on inner surfaces 36$i$ and 40$i$ of light tunnel 30 in response to the electrical signal from AO modulator control unit 220 such that the physical positions of the light tunnel walls move with time. Accordingly, when activated, AO modulator 210 injects acoustic energy into light tunnel 30, which causes walls 36 and 40 to rapidly oscillate in the Y-direction. As a result, at an instant in time, light rays R1 and R2 reflect from inner surfaces 36$i$ and 40$i$ at new positions p1' and p2' that are displaced from positions p1 and p2. This, in turn, cause the paths of light rays R1 and R2 to change, which causes standing wave pattern $P_s$ to shift (i.e., oscillate) about its original position. In other words, the path length differences between interfering rays RS, R1 and R2 are modulated dynamically, causing the standing wave pattern to rapidly shift back and forth along the Y-direction, as indicated by the double arrow. Preferably, the path length difference imparted to light rays R1 and R2 is greater than half the wavelength of the light rays.

Now, the illumination at output end 56 of light tunnel 30 is the time-integrated sum of the standing waves. By displacing walls 36 and 40 sufficiently fast (i.e., in a time much less than one temporal pulse length from laser light source 16) and with sufficient amplitude (e.g., >1 micron), it is possible to entirely wash out standing wave pattern $P_s$. As a result, the interference fringes commonly seen with a coherent source (such as a laser) can be significantly reduced or eliminated. For example, for laser light source 16 having a temporal pulse length of about 100 ns, AO modulator control unit 220 would drive AO modulator 210 at frequencies of 100 MHZ or greater to cause a time-varying deformation in the light tunnel walls 36 and 40 of about 10 to 20 microns in amplitude.

In a preferred embodiment of the present invention, detector D is moved across output end 56 to measure the illumination non-uniformity. This information is sent to AO modulator control unit 220 via an electronic signal. The frequency and amplitude of the AO modulator that provides the optimal illumination uniformity can then be determined in a closed loop fashion by measuring the illumination non-uniformity (i.e., irradiance distribution) in real-time and adjusting the frequency and amplitude of the AO modulation via AO modulation control unit 220.

Solid Light Tunnel Embodiment

Figure 3B:
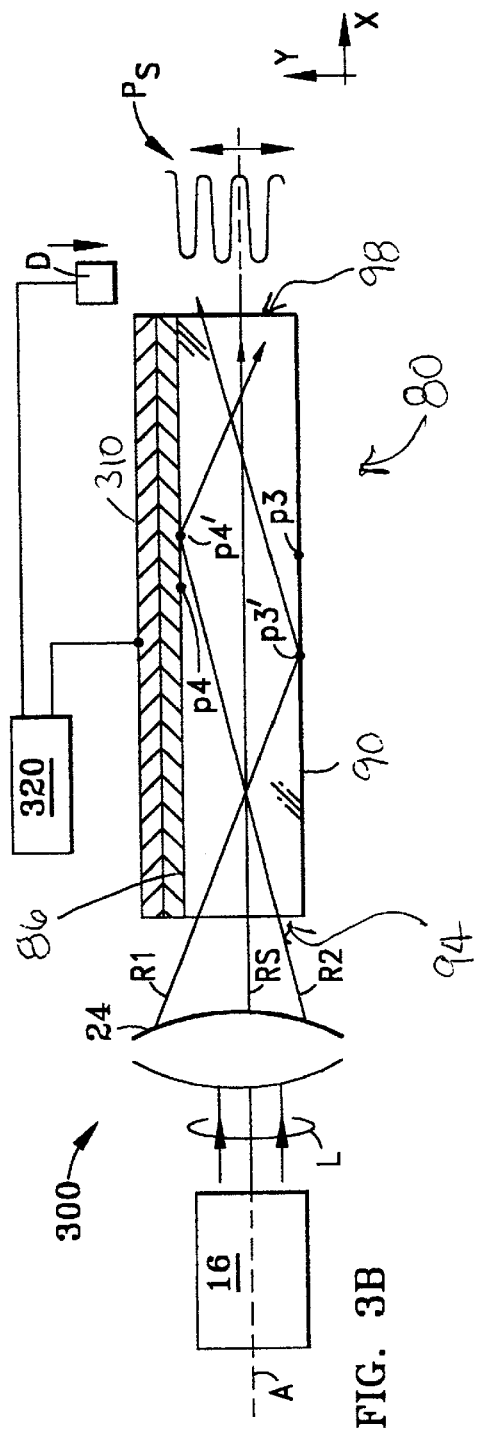
FIG. 3B is a cross-sectional schematic diagram of the light tunnel uniformizer apparatus of the present invention with a solid light tunnel, showing the AO modulators and the paths of light rays through the light tunnel when the AO modulator is activated.

With reference now to FIGS. 3A and 3B, there is shown an illumination uniformizer apparatus 300 similar to apparatus 70 of FIGS. 1A and 1B, except that light tunnel 80 of apparatus 300 is solid and has upper and lower surfaces (i.e., first and second sides) 86 and 90. An exemplary material for light tunnel 80 is fused quartz. Light tunnel 80 further includes a layer 306 of low-index of refraction ($n_c$) optical material (i.e., lower than index $n_1$, i.e., $n_c < n_1$) on at least one of upper and lower surfaces 86 and 90. Layer 306 is designed to preserve the total internal reflection condition that allows light to travel down light tunnel 80. An exemplary material for the low-index layer 306 is magnesium fluoride having a refractive index of about 1.38 at visible wavelengths. An AO modulator 310 similar (if not identical) to AO modulator 210 is arranged atop low-index layer(s) 306. Apparatus 300 further includes an AO modulator control unit 320, similar (if not identical) to AO modulator control unit 220. AO modulator 310 is designed to transmit acoustic waves through layer 306 and into light tunnel 80 so as to set up an acoustic standing wave pattern that causes surfaces 86 and 90 to rapidly oscillate in the Y-direction. Though FIGS. 3A and 3B show a single layer 306 and AO modulator 310 on upper surface 86, apparatus 300 could also include another AO modulator 310 and layer 306 on lower surface 90.

With reference to FIG. 3A and apparatus 300, as in the case for apparatus 200, laser light L from the laser light source is injected into the light tunnel over a range of angles via condenser optical system 24. Light rays RS and R1 and R2 are again shown. Light rays R1 and R2 travel down light tunnel 80, and reflect off surfaces 86 and 90 at positions p3 and p4 due to total internal reflection. When AO modulator 310 is inactive, standing wave patten $P_s$ results at output end 98, in the manner described above. Also as described above, the illumination non-uniformity can be measured at output end 98 by detector D in electronic communication with AO modulation control unit 320.

With reference now to FIG. 3B, AO modulator 310 is activated via an electrical signal from AO modulator control unit 320, which causes a time-varying displacement (i.e., an oscillation) of upper and lower surfaces 86 and 90 of light tunnel 80 in the Y-direction. As a result, at a given instant in time, light rays R1 and R2 reflect off surfaces 86 and 90 at new positions p3' and p4' displaced from positions p3 and p4. This shift imparts a path length difference between interfering rays RS, R1 and R2. Preferably, the path length difference imparted to light rays R1 and R2 is greater than half the wavelength of the light rays.

Accordingly, standing wave pattern $P_s$ that results from the interference of the straight-through ray and light rays R1 and R2 shifts (oscillates) in the Y-direction, as indicated by the double arrow. As in the case of apparatus 200, the illumination at output end 98 of light tunnel 80 is the time-integrated sum of all the standing waves caused by the interference of the various light rays traveling through the light tunnel. Only three light rays (RS, R1 and R2) have been used here for the sake of illustration. By moving surfaces 86 and 90 sufficiently fast (i.e., in a time much less than the temporal pulse length) and with sufficient amplitude (e.g. a few to tens of microns), it is possible to significantly reduce or entirely wash out standing wave pattern $P_s$. As a result, the interference fringes commonly seen with a coherent source (such as a laser) can be reduced or eliminated.

As discussed above in connection with apparatus 200, in a preferred embodiment of the present invention, movable detector D is moved across output end 98 to measure the light energy and thus the illumination non-uniformity. This information is sent to AO modulator control unit 320 via an electronic signal. The frequency and amplitude of the AO modulator 310 that provides the optimal improvement in illumination uniformity can then be determined in a closed loop fashion by measuring the illumination non-uniformity (i.e., light energy distribution) in real-time with detector D while adjusting the frequency and amplitude of the AO modulator 310 with AO modulation control unit 320.

As with apparatus 200, in apparatus 300, for laser light source 16 having a temporal pulse length of about 100 ns, AO modulator control unit 320 drives AO modulator 310 at frequencies of greater that 100 MHZ to cause a time-varying deformation in the light tunnel walls 86 and 90 of about 10 to 20 microns in amplitude.

Either apparatus 200 or 300 above, the AO modulator can move just one of walls 36 and 40 of hollow light tunnel 30, or just one of surfaces 86 and 90 of solid light tunnel 80. Alternatively the walls and surface can be moved synchronously or asynchronously. In addition, the walls or surfaces can be made to change shape. This is determined by the manner in which acousto-optic modulator(s) 210 or 310 are interfaced with the walls of the hollow light tunnel or the surfaces of the solid light tunnel.

For optimum effect, the frequency f of the acoustic modulation is preferably greater than the inverse of the temporal pulse length T (i.e., $f>T^{-1}$). Thus, as mentioned above, for a 10-nsec pulse, an acousto-optic modulator frequency greater than about 100-Mhz is preferable. In addition, the walls of the hollow or the surfaces of the solid light tunnel need be displaced by a distance large enough to cause a path length difference between the intersecting rays of approximately (or greater than) one-half of a wavelength. As an example, for a light tunnel having an axial length of approximately 300 mm and a width of 3 mm, the walls of the hollow light tunnel or the surfaces of the solid light tunnel need to be displaced by approximately 25 microns for light having a wavelength of 500 nm.

The above embodiments are described in two-dimensions for ease of illustration. It will be apparent to one skilled in the art that the present invention is generally applicable to solid and hollow light tunnels having any reasonable number of sides. For example, for a light tunnel having four sides and thus a rectangular cross-section, all four walls or surfaces can be driven with separate AO modulators at separate frequencies. More generally, for a light tunnel having a polygonal cross-section, each surface of the polygon can be driven at its own frequency and amplitude via separate AO modulator control units 220 or 320.

Moreover, although the present invention has been described in the context of a coherent laser light source, the present invention may also be used with an incoherent light source, to the extent that it is capable of smoothing out illumination non-uniformities arising from effects other than the coherence of the light.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A light tunnel apparatus having an output end for uniformizing light traveling through the light tunnel, comprising:
   a) a light tunnel having first and second sides; and
   b) one or more AO modulators respectively arranged on at least one of said first and second sides such that activating said one or more AO modulators causes at least one of said first and second sides to be displaced so as to change the path of light traveling through the light tunnel by an amount sufficient to reduce illumination non-uniformity at the output end.

2. An apparatus according to claim 1, wherein said light tunnel is one of hollow light tunnel with said first and second sides having respective reflective inner surfaces, and a solid light tunnel with a first refractive index.

3. An apparatus according to claim 1, wherein the light traveling through the light tunnel has a temporal pulse length and said AO modulator operates at a frequency greater than the inverse of the temporal pulse length.

4. An apparatus according to claim 3, wherein said AO modulator frequency is greater than 100 MHZ.

5. An apparatus according to claim 1, wherein the light traveling through the light tunnel comprises light rays with a path length and a wavelength, and wherein said AO modulator operates with an amplitude such that interfering light rays are imparted with a path length difference greater than half the wavelength.

6. An apparatus according to claim 5, wherein said AO modulator amplitude is 10 microns or greater.

7. An apparatus according to claim 2, wherein the light tunnel is solid and wherein at least one of said light tunnel first and second sides are coated with a layer of material having a second refractive index that is less than said first refractive index.

8. An apparatus according to claim 2, wherein said light tunnel is solid and made of glass.

9. An apparatus according to claim 8, wherein said glass is quartz or fused silica.

10. An apparatus according to claim 2, wherein said light tunnel is hollow, and said first and second inner surfaces are coated with at least one of a reflective metal and a dielectric.

11. An apparatus according to claim 2, wherein said first and second sides are one of ceramic and glass.

12. An apparatus according to claim 1, further including one or more AO modulator control units electrically connected to respective one or more AO modulators.

13. An apparatus according to claim 12, wherein said one or more AO modulator control units drive said AO modulators at independent frequencies and amplitudes.

14. An illumination uniformizer apparatus comprising, in order along an optical axis:
   a) a light source;
   b) a condenser optical system; and
   c) a light tunnel apparatus according to claim 1.

15. An apparatus according to claim 14, wherein said light source is a laser.

16. An apparatus according to claim 14, further including one or more AO modulator control units electrically connected to respective AO modulator.

17. An apparatus according to claim 1, wherein the total number of sides is four or greater.

18. An apparatus according to claim 12, further comprising a detector electrically connected to said one or more AO modulator control units, wherein said detector can be movably placed at said light tunnel output end to measure illumination non-uniformity at the output end.

19. An apparatus according to claim 18, wherein said measured illumination non-uniformity is a standing wave pattern due to interference effects between light traveling through the light tunnel.

20. A method of uniformizing light traveling through a light tunnel having first and second sides and an output end, comprising the steps of:
   a) injecting light into the light tunnel; and
   b) displacing at least one of the first and second sides by injecting acoustic energy into the light tunnel through at least one of the first and second sides.

21. A method according to claim 20, wherein said step b) includes the step of driving an AO modulator at a frequency of 100 MHz or greater.

22. A method according to claim 20 wherein said step b), said displacement is such that light traveling through the light tunnel comprises light rays with a path length and a wavelength, and wherein said displacement is such that interfering light rays are imparted with a path length difference greater than half the wavelength.

23. A method according to claim 20, wherein the light traveling through the light tunnel has a temporal pulse length, and said acoustic energy has a frequency greater than the inverse of the temporal pulse length.

24. A method according to claim 20, wherein the light tunnel has two or more sides, and wherein said step b) of injecting acoustic energy into the light tunnel includes the step of using different frequencies and amplitudes for each of the two or more sides.

25. A method according to claim 20, wherein said step b) includes the steps of:
   a) measuring a distribution of light energy at the output end of the light tunnel;
   b) determining the degree of non-uniformity of the light energy; and
   c) adjusting the amount of acoustic energy injected into the light tunnel to reduce the degree of light energy non-uniformity.

* * * * *